(12) United States Patent
Ogawa

(10) Patent No.: US 10,693,339 B2
(45) Date of Patent: Jun. 23, 2020

(54) FIELD WINDING SUPPORT MEMBER FOR SALIENT POLE ROTOR

(71) Applicant: MEIDENSHA CORPORATION, Tokyo (JP)

(72) Inventor: Yuji Ogawa, Kawagoe (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/492,226

(22) PCT Filed: Mar. 6, 2018

(86) PCT No.: PCT/JP2018/008484
§ 371 (c)(1),
(2) Date: Sep. 9, 2019

(87) PCT Pub. No.: WO2018/164093
PCT Pub. Date: Sep. 13, 2018

(65) Prior Publication Data
US 2020/0044508 A1 Feb. 6, 2020

(30) Foreign Application Priority Data
Mar. 10, 2017 (JP) .................. 2017-045799

(51) Int. Cl.
*H02K 3/52* (2006.01)
*H02K 1/24* (2006.01)

(52) U.S. Cl.
CPC ............. *H02K 3/527* (2013.01); *H02K 1/246* (2013.01)

(58) Field of Classification Search
CPC .................. H02K 3/527; H02K 1/246

USPC .................................................. 310/194, 214
See application file for complete search history.

(56) References Cited

U.S. PATENT DOCUMENTS

| | | | | |
|---|---|---|---|---|
| 4,990,810 A | * | 2/1991 | Newhouse | H02K 3/527 310/179 |
| 10,097,059 B2 | * | 10/2018 | Imura | H02K 3/32 |
| 2017/0126098 A1 | * | 5/2017 | Furukawa | H02K 9/10 |

FOREIGN PATENT DOCUMENTS

| JP | 52-98902 A | 8/1977 |
|---|---|---|
| JP | 54-17005 U | 2/1979 |
| JP | 61-126757 U | 8/1986 |
| JP | 3-77251 U | 8/1991 |
| JP | 7-163078 A | 6/1995 |

* cited by examiner

*Primary Examiner* — Hahn N Nguyen
(74) *Attorney, Agent, or Firm* — Foley & Lardner LLP

(57) ABSTRACT

A coil support (28) is configured to include a coil support body part (281) that is made of resin and that has abutment surfaces (281c, 281d) to be in respective direct abutments with radial inner surfaces of adjoining field windings (24) and an insertion hole (281a) that is formed along a radial direction of a rotary shaft (21), a bolt (282) with a hexagonal hole that has a base end part fixed to a rotor yoke (22) and a tip end part projecting outward in a radial direction and that is inserted into the insertion hole (281a) of the coil support body part (281), and a disc spring (283) that is interposed between the rotor yoke (22) and the coil support body part (281) and that presses the coil support body part (281) toward the field windings (24), and to have a spot-faced part (281b) that is formed on a radial outside of the insertion hole (281a) to have a larger diameter than the insertion hole (281a).

2 Claims, 3 Drawing Sheets

FIELD WINDING SUPPORT MEMBER FOR SALIENT POLE ROTOR

TECHNICAL FIELD

The present invention relates to a field winding support member for a salient pole rotor.

BACKGROUND ART

Hitherto, in salient-pole rotary electric machines, it has been publicly known to support field windings of a rotor of a salient-pole electric machine by a push-up device in order to prevent the occurrence of defects caused by shrinkage of an insulating material between respective layers of the field windings of the rotor due to change over the years (see, for example, the following Patent Publications 1 and 2, etc.).

Such push-up device has a structure that supports the field windings by disposing electrical insulation plates, such as high-strength phenol plates, bakelite plates, glass epoxy laminated plates, etc., on respective undersurfaces of the field windings and by pressing the field windings outwardly in radial direction via these electrical insulation plates.

PRIOR ART PUBLICATIONS

Patent Publications

Patent Publication 1: JP Utility Model Application Publication Heisei 3-77251.
Patent Publication 2: JP Utility Model Application Publication Show a 61-126757.

SUMMARY OF THE INVENTION

Task to be Solved by the Invention

However, there has been a problem to cause a risk that, when electrical insulation plates are disposed on the undersurfaces of the field windings, this electrical insulation material acts as a heat insulation material to prevent cooling by ventilation cooling and cause heat generation of the coils.

Thus, it is considered that the electrical insulation plates are abolished, and a part of the push-up device to be in abutment with the rotor field windings is constructed by an electrical insulation material, thereby directly supporting the field windings by the push-up device.

On the other hand, in general, according to a standard such as IEC60664-1, etc., the rotor field windings are driven at an effective voltage of 630 V or lower that is equivalent to low-voltage rotary machines, and 10 mm is recommended as the minimum creepage distance, although its electrical insulation creepage distance also varies depending on the surface fouling degree of the material or the electrical insulation material. Therefore, as the creepage distance to the rotor field winding, an electrical insulation distance in consideration of safety factor in this minimum creepage distance is generally secured.

From such thing, it is an object of the present invention to provide a field winding support member for a salient pole rotor, which is capable of supporting the rotor field windings, while securing a desirable electrical insulation creepage distance, even if the electrical insulation plates on the undersurfaces of the rotor field windings have been abolished.

Means for Solving the Task

A field winding support member for a salient pole rotor according to a first invention for solving the above-mentioned task is a field winding support member for a salient pole rotor, the salient pole rotor being such that a rotary shaft is equipped with a rotor core comprising a rotor yoke, magnetic pole projection parts and magnetic pole head parts and that a field winding is disposed on a peripheral surface of each magnetic pole projection part, the field winding support member for the salient pole rotor pressing the field windings, which are adjacent to each other in a circumferential direction, outwardly in a radial direction, the field winding support member for the salient pole rotor being characterized by comprising:

a coil support body part that is made of an electrical insulation material and is provided with abutment surfaces respectively directly abutting radial inner surfaces of the adjacent field windings and with an insertion hole formed along a radial direction of the rotary shaft;

a bolt that has a base end part fixed to the rotor yoke and a tip end part projecting outwardly in a radial direction, the tip end part being inserted into the insertion hole of the coil support body part; and an elastic body that is interposed between the rotor yoke and the coil support body part and presses the coil support body part toward the field windings, wherein the coil support body part is formed, on an outside part of the insertion hole in a radial direction of the rotary shaft, with a spot-faced part having a larger diameter than the insertion hole.

Furthermore, a field winding support member for a salient pole rotor according to a second invention for solving the above-mentioned task is characterized in that the electrical insulation material is resin.

Advantageous Effect of the Invention

A field winding support member for a salient pole rotor according to the present invention is capable of supporting the rotor field windings, while securing a desirable electrical insulation creepage distance, even if the electrical insulation plates on the undersurfaces of the rotor field windings have been abolished.

MODE FOR IMPLEMENTING THE INVENTION

In the following, a field winding support member for a salient pole rotor according to the present invention is explained by using the drawings.

Embodiment

By using FIG. 1 to FIG. 6, electrical insulation plates of a salient pole rotor according to an embodiment of the present invention are explained in detail.

Figure 1:
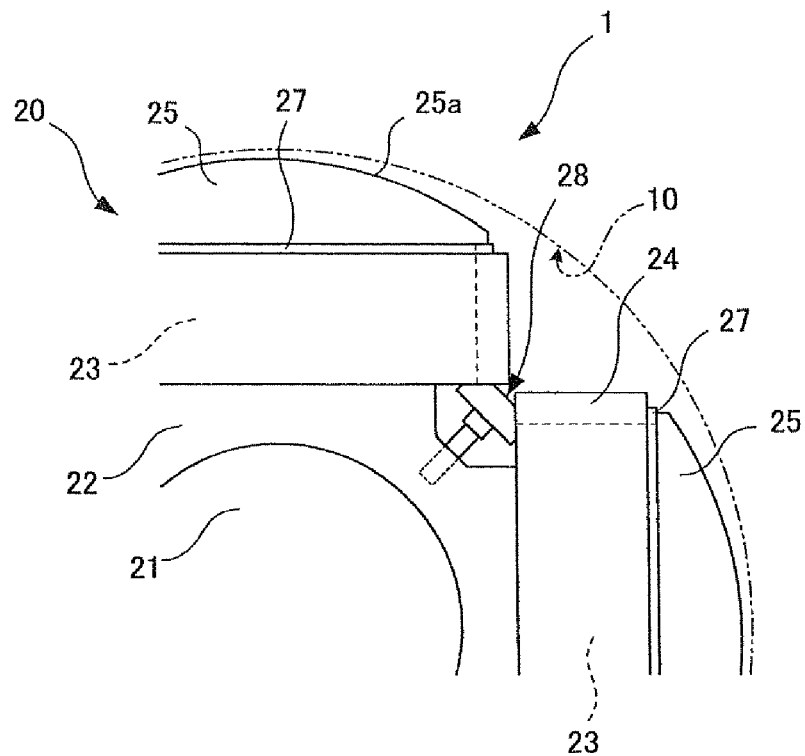
FIG. 1 is a schematic view showing a salient-pole rotary electric machine.

As shown in FIG. 1, a salient-pole rotary electric machine 1 has a generally cylindrical stator 10 that is fixed to a frame, etc. not shown in the drawings, and a salient-pole rotor 20 that is rotatably held on an inner peripheral side of the stator 10.

A rotary shaft 21, a rotor yoke 22 and magnetic pole projection parts 23 of the salient pole rotor 20 are integrally formed. For example, they are formed by cutting out of a massive magnetic material. The rotary shaft 21 becomes a rotation center of the salient pole rotor 20 and is rotatably supported at its both end portions in the axial direction by bearings (not shown in the drawings). The rotor yoke 22 is integrally formed at a center part of the rotary shaft 21 in the axial direction in a manner to extend in the axial direction to cover the periphery of the rotary shaft 21. The magnetic pole projection parts 23 are integrally formed at positions of an outer peripheral part of the rotor yoke 22 that are 90 degrees apart in the circumferential direction. That is, the magnetic pole projection parts 23 project outwardly from the outer peripheral part of the rotor yoke 22 in the radial direction and are disposed at even intervals in the circumferential direction.

A field winding (field coil) 24 is disposed on a peripheral surface of the magnetic pole projection part 23 with an interposal of an electrical insulation plate (not shown in the drawings). The field winding 24 is constructed by alternately stacking platy conductors and platy insulation members in the radial direction.

A magnetic pole head part 25 is fixed onto a top surface (an outer end surface in the radial direction) of the magnetic pole projection part 23 by a plurality of bolts (not shown in the drawings). A gap (gap of several millimeters in the radial direction) is maintained between an outer peripheral surface of the magnetic pole head part 25 and an inner peripheral surface of the stator 10.

A magnetic pole core is formed by the magnetic pole projection parts 23 and the magnetic pole head parts 25. Furthermore, a rotor core is formed by the rotor yoke 22, the magnetic pole projection parts 23, and the magnetic pole head parts 25.

An electric insulation plate 27 is provided between a top surface (an outer end surface in the radial direction) of the field winding 24 and an inner peripheral surface (an inner end surface in the radial direction) of the magnetic pole head part 25.

Then, between the two adjacent field windings 24 in the circumferential direction in the present embodiment, a coil support (field winding support member) 28 is arranged that pushes up the field windings 24 by a direct abutment against their inner peripheral sides (inner end surfaces in the radial direction).

Figure 2:
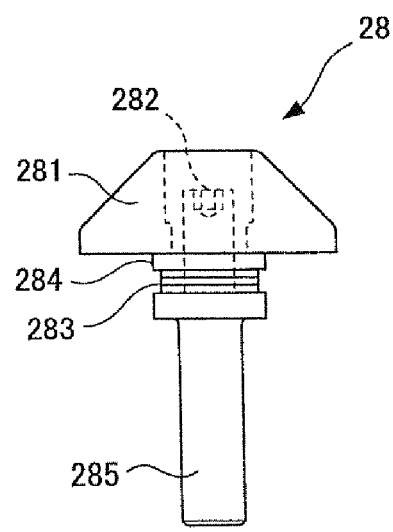
FIG. 2 is a front view of a field winding support member for a salient pole rotor according to an embodiment of the present invention.

As shown in FIG. 2, the coil support 28 is constructed to contain a coil support body part 281 made of resin (electrical insulation member), a bolt 282 with a hexagonal hole that has a tip end part inserted into an insertion hole 281a (see FIG. 3) provided in the coil support body part 281 and a base end part fixed to the rotor yoke 22, and a disc spring (an elastic body) 283 that inserts the bolt 282 with a hexagonal hole and is interposed between the rotor yoke 22 and the coil support body part 281. In the present embodiment, the disk spring 283 is supported by a washer 284 interposed between that and the coil support body part 281, and a spool retainer 285 interposed between that and the rotor yoke 22.

Figure 3:
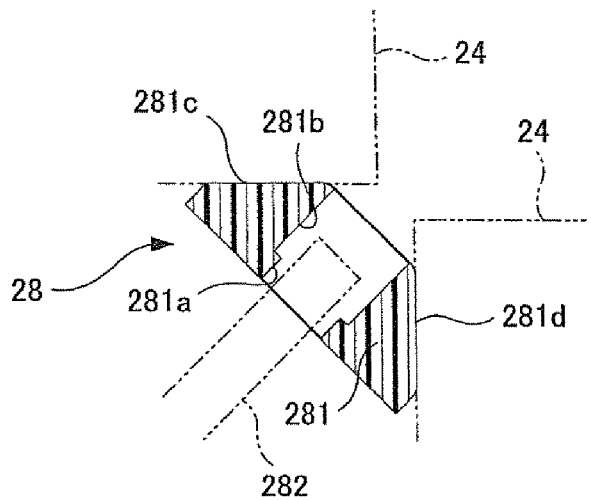
FIG. 3 is a sectional view of the coil support body part shown in FIG. 2.
Figure 4:
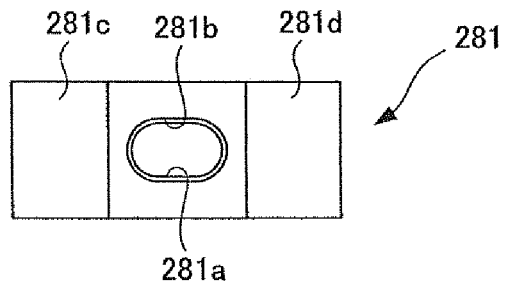
FIG. 4 is a top view of the coil support body part shown in FIG. 2.

As shown in FIG. 3 and FIG. 4, the coil support body part 281 is formed in a generally trapezoidal shape in side view. Its surfaces corresponding to legs are abutment surfaces 281c, 281d that are respectively brought into abutment with inner surfaces in the radical direction of the adjacent field windings 24 in the circumferential direction.

Furthermore, the above-mentioned insertion hole 281a is provided at a center portion of the coil support body part 281 to be along the radial direction of the rotary shaft 21. Then, on an upper bottom side (an outer side in the radial direction of the rotary shaft 21) of this insertion hole 281a, there is provided a spot-faced part 281b that has a larger diameter than the insertion hole 281a. In the present embodiment, as shown in FIG. 4, the insertion hole 281a is formed into a long hole such that error in the production of the field windings 24, etc. can be absorbed. With this, the spot-faced part 281b is also formed into a long hole.

Figure 5:
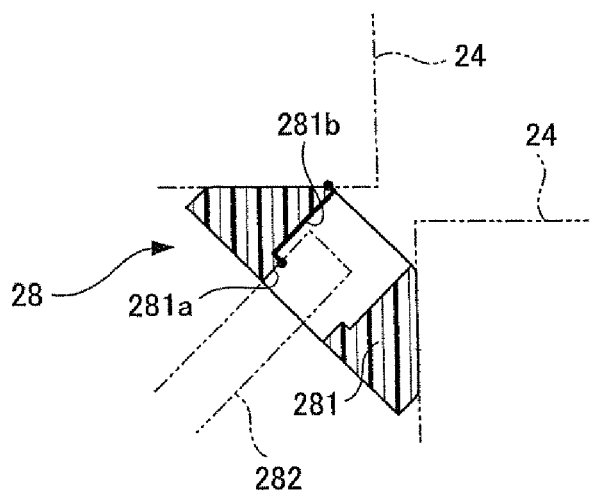
FIG. 5 is an explanatory view showing a creepage distance in the case of applying a field winding support member for a salient pole rotor according to an embodiment of the present invention.

The field winding support member of the salient pole rotor according to the present embodiment constructed as above is provided with the spot-faced part 281b. With this, as shown in FIG. 5, even in case that the bolt 282 with the hexagonal hole is in abutment with an end portion of the insertion hole 281a of the coil support body part 281 by error in the production of the field windings 24, etc., it becomes possible to sufficiently secure the creepage distance between the field winding 24 and the bolt 282 with the hexagonal hole, as shown by a thick line in FIG. 5.

Figure 6:
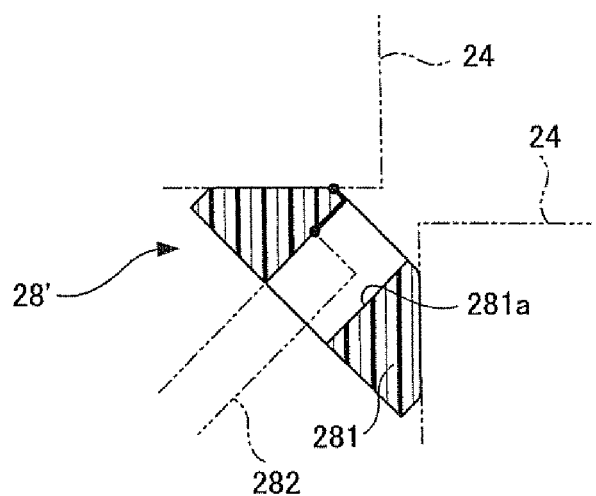
FIG. 6 is an explanatory view showing a creepage distance in the case of the coil support body part having no spot-faced part.

That is, in the case of abolishing the electrical insulation plates on the undersurfaces of the field windings 24 without providing the spot-faced part 281b, like a coil support 28' shown in FIG. 6, when the bolt 282 with the hexagonal hole is in abutment with an end portion of the insertion hole 281a of the coil support body part 281, as shown by a thick line in FIG. 6, it becomes difficult to sufficiently secure the creepage distance from the field winding 24 to the bolt 282 with the hexagonal hole. In contrast with this, as mentioned above, the use of the field winding support member for the salient pole rotor according to the present embodiment makes it possible to secure a desired electrical insulation creepage distance, even if abolishing the electrical insulation plates on the undersurfaces of the field windings 24.

EXPLANATION OF SIGNS

1: a salient-pole rotary electric machine;
10: a stator;
20: a salient pole rotor;
21: a rotary shaft;
22: a rotor yoke;
23: a magnetic pole projection part;
24: a field winding;
25: a magnetic pole head part;
25a: an outer peripheral surface;
27: an electrical insulation plate;
28, 28': a coil support;
281: a coil support body part;
281a: an insertion hole;
281b: a spot-faced part;
281c, 281d: an abutment surface;
282: a bolt with a hexagonal hole
283: a disk spring;
284: a washer; and
285: a spool retainer.

The invention claimed is:

1. A field winding support member for a salient pole rotor, the salient pole rotor being such that a rotary shaft is equipped with a rotor core comprising a rotor yoke, magnetic pole projection parts and magnetic pole head parts and that a field winding is disposed on a peripheral surface of each magnetic pole projection part, the field winding support member for the salient pole rotor pressing the field windings, which are adjacent to each other in a circumferential direction, outwardly in a radial direction, the field winding support member for the salient pole rotor being characterized by comprising:

> a coil support body part that is made of an electrical insulation material and is provided with abutment surfaces respectively directly abutting radial inner surfaces of the adjacent field windings and with an insertion hole formed along a radial direction of the rotary shaft;
>
> a headless bolt that has a base end part fixed to the rotor yoke and a tip end part projecting outwardly in a radial direction, the tip end part being inserted into the insertion hole of the coil support body part; and
>
> an elastic body that is interposed between the rotor yoke and the coil support body part and presses the coil support body part toward the field windings,
>
> wherein the coil support body part is formed, on an outside part of the insertion hole in a radial direction of the rotary shaft, with a spot-faced part for securing a creeping distance between the field winding and the bolt, the spot-faced part having a larger diameter than the insertion hole,
>
> wherein the spot-faced part is such that a distance from the field winding to an opening edge of the spot-faced part is shorter than a distance from the field winding to an opening edge of the insertion hole.

2. The field winding support member for the salient pole rotor as claimed in claim 1, which is characterized in that the electrical insulation material is resin.

* * * * *